June 13, 1967     R. L. McCLEARY     3,324,787

INFUSER FOR TEA LEAVES

Filed March 4, 1965

INVENTOR.
Robert L. McCleary

BY

ATTORNEY

United States Patent Office 3,324,787
Patented June 13, 1967

3,324,787
INFUSER FOR TEA LEAVES
Robert L. McCleary, Corning, N.Y., assignor to Corning Glass Works, Corning, N.Y., a corporation of New York
Filed Mar. 4, 1965, Ser. No. 437,248
4 Claims. (Cl. 99—319)

ABSTRACT OF THE DISCLOSURE

The invention comprises an improved tea leaf infuser having an easily removable, upwardly-open, imperforate, cylindrical sidewall portion attached to a perforate bottom plate by means of a handled clip.

---

In the past, it has been customary to brew tea by suspending a tea ball or other perforated closed cannister, containing tea leaves, within hot water poured into a teapot. The essence of the tea is extracted by diffusion of the water through the tea ball or perforated closed cannister. However, the best brewed tea is obtained by initially pouring boiling water over the tea leaves to extract the essence therefrom, and this is not possible with the standard tea ball or other closed type of cannister.

A further disadvantage inherent with the standard type of perforated cannister is the fact that the minimum number of cups which may be brewed successfully is limited by the positionment of the cannister above the bottom of the teapot. With my improved construction, the infuser is positioned within the teapot to rest directly upon the bottom surface thereof so that it is possible to successfully brew a very minimum number of cups, if desired.

It thus has been an object of my invention to provide an improved infuser for tea leaves which has an upwardly open top portion for the direct application of boiling water to the tea leaves contained therewithin, and imperforate cylindrical sidewalls which minimizes the number of holes or perforations required, thus facilitating the cleansing of the infuser assembly.

A further object of my invention has been to provide an improved infuser construction for tea leaves which rests directly upon the bottom inner surface of the teapot so as to facilitate the brewing of a minimum amount of tea.

These and other objects of my invention will become apparent to those skilled in the art from the following disclosure and accompanying drawings in which.

Figure 1:
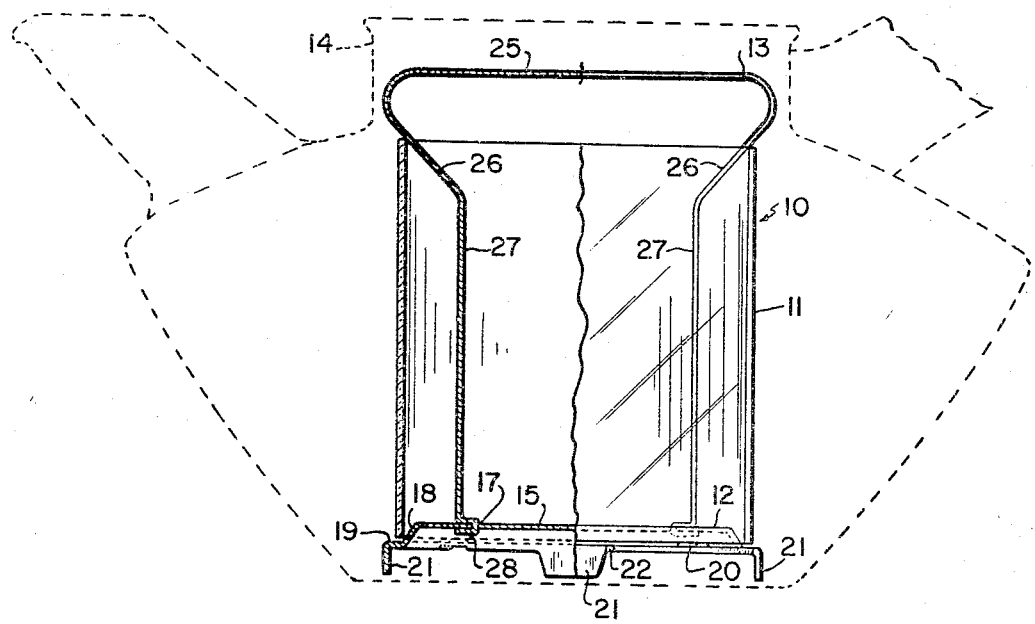
FIGURE 1 is a side elevational view, partially in section, of an infuser assembly embodying my invention, illustrating its positionment within a teapot shown in dash lines.
Figure 2:
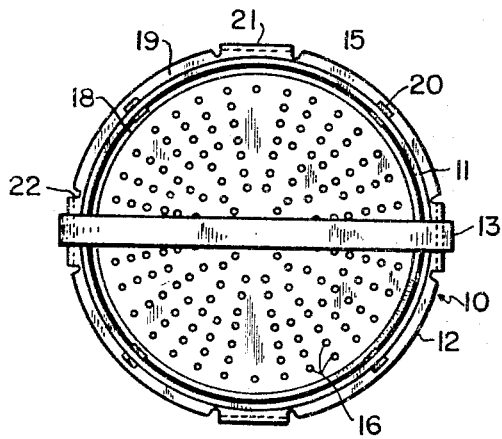
FIGURE 2 is a top plan view of the assembly shown in FIGURE 1.

Referring now to the drawings, and particularly FIGURE 1, the entire infuser assembly is indicated at 10 and comprises an impervious cylindrical wall portion 11, preferably of glass, a bottom plate 12, preferably of sheet metal, and a spring-like handled retaining clip 13. The assembly 10 is shown positioned within a teapot 14 indicated in dash lines.

Figure 3:
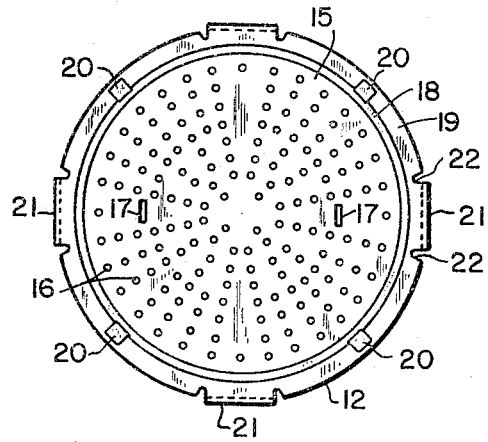
FIGURE 3 is a top plan view of the perforated metal bottom plate, forming a part of the infuser assembly.

Referring now also to FIGURE 3, the bottom plate 12 is shown as comprising an upper central portion 15 having a plurality of diffuser perforations or flow openings 16, and a pair of slotted openings 17 for receiving the lower end of the handle clip 13. The upper central portion 15 tapers downwardly at 18 into a flanged rim 19. The rim 19 is provided with a plurality of raised dimples 20 for maintaining the lower edge of the cylindrical or tubular member 11 in spaced-apart relationship with the annular rim or flange portion 19. A plurality of downwardly-extending feet 21 project downwardly from the rim 19 and have notched portions 22 adjacent each side thereof to facilitate their formation.

The handled-clip member 13 has a top handle portion 25 for grasping the entire infuser assembly, flexible or spring metal converging portions 26, downwardly-extending leg portions 27, and bent feet portions 28 which lockably extend through the slots 17 of the base plate 12. The handle-clip member 13 may be attached to the base plate 12 by means of off-set prongs or snap-in means which project through the slots 17 so as to impart greater flexibility to the member 13 and allow the removal of the cylindrical or tubular member 11 from the base plate. However, if desired, the member 13 may be formed of a more rigid metal to securely mount the tubular member 11 on the base plate 12 as a permanent assembly.

In operation, tea leaves are provided within the tubular member 11 secured on base plate 12, and the infuser assembly 10 is positioned within the teapot 14 by means of handle portion 25, so that feet 21 rest upon the bottom surface of the teapot. Boiling water is then poured downwardly into the upwardly open end of the cylindrical member 11 directly onto the tea leaves. The boiling water then passes through the plurality of diffuser perforations or flow openings 16 in the base plate 12 to seek its own level within the teapot. In addition, since the cylindrical member 11 is positioned upon the dimples 20, flow is also permitted between the bottom edge of the member 11 and the top surface of flange 19. The leaves are then permitted to steep within the fluid for a desired period of time and the entire infuser assembly 10 is then removed from the teapot by means of the top handle portion 25.

It thus can be seen that my invention provides an improved infuser assembly for tea leaves which supplies ample room for expansion of the tea; minimizes the number of holes required for diffusion of liquid during steeping, resulting in an easier cleaning of the infuser; and because of its low positionment within the teapot, allows a minimum number of cups to be successfully brewed.

Although I have disclosed the now preferred embodiment of my invention, it will be apparent to those skilled in the art that various changes and modifications may be made thereto without departing from the spirit and scope thereof as defined in the appended claims.

I claim:
1. In combination with a tea pot, an improved infuser for tea leaves comprising, a base plate positioned upon the inner bottom surface of said tea pot, said base plate having a perforated upper central portion and a lower support rim portion connected by a tapered bounding portion; a tubular member comprising an upwardly opened removable imperforate sidewall portion positioned upon said support rim portion; and a handled retaining clip means secured to said base plate for urging said sidewall portion downwardly in operative engagement with said support rim.

2. An improved combination as defined in claim 1 wherein said lower support rim portion of said base plate is provided with a plurality of raised portions for maintaining the lower edge of said imperforate sidewall portion in spaced apart relationship with said rim to facilitate flow therebetween.

3. An improved combination as defined in claim 1 wherein said tapered bounding portion of said base plate tapers downwardly and outwardly from said upper central portion to said lower support rim portion so as to facilitate the positioning and retention of the lower end of said sidewall portion in operative engagement with said base plate.

4. An improved combination as defined in claim 1 wherein said handled retaining clip means comprises a flexible spring-like metal band secured at its lower end to said base plate and having outwardly-extending portions downwardly engaging upper edge portions of said sidewall portion so as to maintain said sidewall portion in a downwardly urged position in operative engagement with said base plate, and said outwardly-extending portions being sufficiently flexible to disengage the upper edge portions of said sidewall portion so as to permit the ready removal thereof from the base plate.

References Cited

UNITED STATES PATENTS

| | | |
|---|---|---|
| 405,348 | 6/1889 | Crandell. |
| 674,456 | 5/1901 | Darden _____ 99—297 X |
| 682,214 | 9/1901 | Martin. |
| 2,562,433 | 7/1951 | Moore _____ 99—319 |
| 2,868,110 | 1/1959 | Kehoe _____ 99—319 X |
| 3,020,823 | 2/1962 | Musso _____ 99—297 X |

FOREIGN PATENTS 961,252    11/1949    France.

WALTER A. SCHEEL, *Primary Examiner.*

S. P. FISHER, *Assistant Examiner.*